(12) United States Patent
Lamesch

(10) Patent No.: US 11,821,762 B2
(45) Date of Patent: Nov. 21, 2023

(54) SYSTEM FOR CAPACITIVE OBJECT DETECTION

(71) Applicant: IEE INTERNATIONAL ELECTRONICS & ENGINEERING S.A., Echternach (LU)

(72) Inventor: Laurent Lamesch, Reichlange (LU)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 254 days.

(21) Appl. No.: 17/293,317

(22) PCT Filed: Nov. 12, 2019

(86) PCT No.: PCT/EP2019/081003
§ 371 (c)(1),
(2) Date: May 12, 2021

(87) PCT Pub. No.: WO2020/099391
PCT Pub. Date: May 22, 2020

(65) Prior Publication Data
US 2022/0011139 A1  Jan. 13, 2022

(30) Foreign Application Priority Data

Nov. 13, 2018 (LU) ........................................ 100985

(51) Int. Cl.
*G01D 5/24* (2006.01)
*B60N 2/00* (2006.01)
(Continued)

(52) U.S. Cl.
CPC ................ *G01D 5/24* (2013.01); *B60N 2/002* (2013.01); *B60N 2/5678* (2013.01); *B62D 1/06* (2013.01); *H05B 3/06* (2013.01); *H05B 2203/003* (2013.01)

(58) Field of Classification Search
CPC ........ G01R 27/00; G01R 27/02; G01R 27/26; G01R 27/2605; G01D 5/00; G01D 5/12;
(Continued)

(56) References Cited

U.S. PATENT DOCUMENTS

| 4,766,368 A | * | 8/1988 | Cox ..................... G01D 5/2417 324/688 |
| 2004/0019810 A1 | * | 1/2004 | Casebolt ............. G06F 3/03543 713/300 |

(Continued)

FOREIGN PATENT DOCUMENTS

| EP | 2572929 A1 | 3/2013 |
| EP | 3048029 A1 | 7/2016 |
| WO | 2013007541 A1 | 1/2013 |

OTHER PUBLICATIONS

International Search Report corresponding to International Application No. PCT/EP2019/081003, dated Feb. 6, 2020, 5 pages.
(Continued)

*Primary Examiner* — Hoai-An D. Nguyen
(74) *Attorney, Agent, or Firm* — REISING ETHINGTON P.C.

(57) ABSTRACT

A system for capacitive object detection. In order to provide means for efficiently using the circuitry of an electrical heating device for capacitive object detection, the system includes: an elongate conductive element extending between a first terminal and a second terminal, wherein the first terminal is coupled to ground via a capacitive element and is connectable to an electrical power source, and the second terminal is connected to ground; and a detection circuit connected to at least one detection node disposed on the conductive element between the first and second terminal. The detection circuit is adapted to capacitively detect the
(Continued)

presence of an object in the proximity of the conductive element based on an impedance associated with the object.

20 Claims, 4 Drawing Sheets

(51) Int. Cl.
*B60N 2/56* (2006.01)
*B62D 1/06* (2006.01)
*H05B 3/06* (2006.01)

(58) Field of Classification Search
CPC ... G01D 5/14; G01D 5/24; B60N 2/00; B60N 2/002; B60N 2/56; B60N 2/5678; B60N 2/5685; B60R 21/00; B60R 21/01; B60R 21/015; B60R 21/01512; B60R 21/0153; B60R 21/01532; B60R 21/0154; B62D 1/00; B62D 1/02; B62D 1/04; B62D 1/06; H05B 1/00; H05B 1/02; H05B 1/0227; H05B 1/023; H05B 1/0236; H05B 1/0238; H05B 3/00; H05B 3/02; H05B 3/06; H05B 3/20; H05B 3/34; H05B 2203/00; H05B 2203/002; H05B 2203/003; H05B 2203/013; H05B 2203/029
USPC .............................. 324/600, 649, 658, 686
See application file for complete search history.

(56) References Cited

U.S. PATENT DOCUMENTS

| | | |
|---|---|---|
| 2009/0295412 A1 | 12/2009 | Griffin |
| 2013/0098890 A1 | 4/2013 | Virnich |
| 2014/0131344 A1 | 5/2014 | Lamesch |
| 2016/0011693 A1* | 1/2016 | Liu ....................... G06F 3/0443 345/174 |
| 2016/0096543 A1 | 4/2016 | Naitou |

OTHER PUBLICATIONS

Written Opinion corresponding to International Application No. PCT/EP2019/081003, dated Feb. 6, 2020, 6 pages.

* cited by examiner

SYSTEM FOR CAPACITIVE OBJECT DETECTION

TECHNICAL FIELD

The invention generally relates a system for capacitive object detection.

BACKGROUND

In modern vehicles, it can be necessary to detect whether the driver has his hands on the steering wheel (e.g. in order to determine whether the driver is ready to carry out a steering action). Steering assistance may include an active correction possibility for the driver to be used in certain circumstances. For example, a provision may be made for a steering assistance system to be activated only when the driver has his hands on the steering wheel. In most countries, it is mandatory that the vehicle when moving is under the control of the driver, even if modern assistance systems would be able to safely operate the vehicle in certain situations. In order to identify whether or not at least one hand is positioned on the steering wheel, several concepts have been developed. One approach uses capacitive sensors, which detect a hand by its influence on an electric field generated by the sensor. While these sensors are more reliable, they considerably increase the complexity of the steering wheel. In order to overcome this problem, attempts have been made to use the existing circuitry of the steering wheel heating for capacitive detection.

In a different application, capacitive sensors are also used to detect the occupancy state of a vehicle seat. The capacitive occupant detection or classification systems generally comprises at least one antenna electrode which is arranged in a seating surface of the seat. In operation, an oscillating electric signal is applied to at least one antenna electrode which thereupon emits an electric field into a region of space proximate to the antenna. The influence of an object or living being on the electric field is the detected in order to determine the seat occupancy status. The idea of using a seat heater structure as antenna electrode in such a capacitive system has also been known for a long time.

However, using an electrical heater as a capacitive sensing element requires an electrical decoupling between the heating function and the sensing function. This electrical decoupling is achieved by additional discrete elements, e.g. some switches, inductors or common mode coils. These additional decoupling elements can be expensive and use a significant amount of space, especially if the maximum heating current is large, e.g. higher than 15 A.

SUMMARY

It is thus an object of the present invention to provide means for efficiently using the circuitry of an electrical heating device for capacitive object detection.

This problem may be solved by a system for capacitive object detection according to the claims.

The invention provides a system for capacitive object detection. In general, different kinds of objects may be detected, in particular a body part of a user, like a hand or a finger.

In at least some embodiments, the system comprises an elongate conductive element extending between a first terminal and a second terminal. The conductive element could be any kind of conductor, like a wire, a printed conductor path on a printed circuit board or on a flexible substrate etc. The conductive element can be disposed along at least a portion of a surface of a component or device, for example a vehicle component like a steering wheel, a dashboard, a seat or the like. Normally, it is disposed underneath some isolating lining that forms the physical surface of the component, which surface may be designed to be touched by a user.

The conductive element extends between a first terminal and a second terminal. Normally, but not necessarily, these terminals correspond to the physical end points of the conductive element. The first terminal is coupled to ground and is connectable to an electrical power source. The first terminal may e.g. be coupled to ground via a capacitive element (capacitor), however the coupling via a dedicated capacitive element is not necessarily required. The capacitive element is e.g. not required if there is already an AC ground path, through the parasitic elements of the power switch for example. Also, if the heater is always powered, a dedicated capacitive element is not needed. For other wired sensors which may not be heaters, a permanent AC ground connection may be present anyway. By coupling the first terminal to ground, one could also say that the first terminal is connected to AC ground, i.e. it has a well-defined AC potential. Also, it is connectable to an electrical power source, which normally means that it is either permanently connected to the electrical power source or it is connected to the electrical power source via a switch so that an electrical connection can be established temporarily. The electrical power source may be a current source or a voltage source; typically it can be a DC power source. In particular, the conductive element could be a heating element and the electrical power source could supply a heating current or voltage, respectively. The second terminal is connected to ground. In this context, it is understood that the expression "is connected to ground" means that the terminal is connected to AC ground, i.e. it has AC ground potential. When the conductive element is connected to the electrical power source, a current flows from the electrical power source through the conductive element to ground. In general, each of the first and second terminal is a part of the conductive element that is adapted for connection to the power source or ground, respectively. Each of the connections may be established via another conductor, like a wire or a printed conductor path that is detachably or non-detachably connected to the respective terminal.

The system further comprises a detection circuit connected to at least one detection node disposed on the conductive element between the first and second terminal. The detection unit is connected to at least one detection node, which means that it is electrically connected. However, the electrical connection does not necessarily have to be a DC connection, but it could be an AC connection. For example, the coupling may be achieved via an electric and/or magnetic field. The detection circuit may e.g. comprise an electrical power source, a signal generator, an amplifier, an analogue-to-digital converter, a transceiver, a processing unit and other components necessary for carrying out the functions described below. It is understood that the detection unit may at least partially be software-implemented.

The detection circuit is adapted to capacitively detect the presence of an object in the proximity of the conductive element based on an impedance associated with the object. The object, if present, is detected capacitively, which means that it is detected based on its influence on an electric field in the proximity of the conductive element. This electric field can be generated by charges in the conductive element and/or it may induce charges in the conductive element. As will be explained below, the detection circuit can apply an electrical signal via the at least one detection node and/or it can detect an electrical signal via the at least one detection node. In particular, the detection circuit may be adapted to determine an impedance between the at least one detection node and ground. This impedance, in turn, partially depends on the impedance of the conductive element and partially on the impedance associated with the object. While the former impedance is normally mainly resistive and inductive, the latter is normally mainly capacitive. The inductive impedance of the conductive element, or in other words, its inductance, is used to decouple the detecting function of the detection circuit from the function of the electrical power source, e.g. the heating function. The skilled person will appreciate, that in the expression "to decouple" refers to the decoupling of the signal/measurement path from the power path. The inductance of the wire replaces the inductance of a dedicated decoupling inductor or common mode choke as used in the prior art systems.

While the detection circuit is in general configured to detect the presence of an object, it is preferably configured to determine a position of the object. In other words, the detection unit can not only detect whether an object is present near the conductive element, e.g. on an electrically isolating surface beneath which the conductive element is disposed, but also in which part of the surface. For example, if the conductive element is disposed along the circumference of a steering wheel, the detection unit may be configured to determine an angular position of a hand of a driver.

The detection circuit is configured to operate at least one detection node in a loading mode, in which the detection circuit applies a detection signal to the at least one detection node and detects the object based on a response signal at the detection node. The detection signal can be a voltage signal or a current signal. The detection circuit may comprise a dedicated electrical power source, which may be referred to as a detector power source. This detector power source can be a voltage source or a current source. Even if it is a voltage source, the detection signal can be a current signal, e.g. if the detector power source is connected to the detection node via a coupling element like an impedor. The general principle of the loading mode is that an (alternating) electric field is generated in the vicinity of the conductive element when the detection signal is applied to the detection node. If no object is present, the electric field normally extends between the conductive element and ground (e.g. a vehicle component having ground potential). If an object is present, this corresponds to connecting the conductive element to ground via an (unknown) impedance caused by the object. Thus, one could say that operating the detection node in the loading mode corresponds to an impedance measurement where the unknown impedance of the object is connected in parallel to the impedance of the conductive element. The "branching point" of the parallel connection corresponds roughly to that portion of the conductive element where the object is located. Therefore, if this portion is close to the detection node, the influence of the object on the total impedance is more significant than if the portion is close to a terminal.

In general, the influence of the (mostly inductive) impedance of the conductive element can make it difficult to determine the impedance of the object with sufficient accuracy or reliability. However, there are several options how to reduce or eliminate this influence. According to at least some embodiments, the detection circuit is adapted to sequentially and/or simultaneously apply two different frequencies as the detection signal to the at least one detection node and to detect the object based on a frequency-dependent response signal. In other words, the detection circuit applies a detection signal that comprises at least two different frequencies. The different frequencies may be applied one after another, i.e. sequentially. Alternatively or additionally, they may be applied simultaneously, in which case the detection signal is a superposition of different frequencies. In both cases, the response signal is in general frequency-dependent. For instance, if the detection signal is a voltage signal applied to the respective detection node, the response signal is the current flowing through this detection node. The relation between the amplitudes of the current and the voltage will be different for each frequency. Since the frequency dependence of the impedance by the conductive element is mainly inductive, it differs from the frequency dependence of the impedance of the object, which is mainly capacitive. Therefore, it is possible to isolate the capacitive contribution by taking into account the response signal for each of the two frequencies. If the detection signal comprises two distinct frequencies $f_a$ and $f_b$ and the two respective measured complex admittances are called $Y_a$ and $Y_b$, the corrected capacitance can be calculated as follows:

$$\frac{1}{2\times\pi}\times\mathrm{Im}\left(\frac{Y_a\cdot f_a - Y_b\cdot f_b}{f_b^2 - f_a^2}\right)$$

It will be appreciated that the assumption here is that the impedance is purely inductive. For the case that there is also a resistive part, a curve fitting of an RLC model to the measured RLC impedance over frequency is an option to determine the inductive and capacitive parts.

According to one embodiment of the invention, the detection circuit is connected to only one detection node. Alternatively, the detection circuit can be connected to a plurality of detection nodes between the first and second terminal. In particular, the detection circuit can be individually connected to a plurality of detection nodes, while some detection nodes may be connected such that the detection circuit can only access them collectively. The different detection nodes can be utilized in various ways, as will be explained below.

It is preferred that the conducting element is disposed in a meandering way between at least one detection node and at least one terminal. More specifically, the conducting element can comprise alternatingly directed portions (i.e. portions leading "forward" and "backward"), wherein a length of each portion is preferably much larger than a distance between two neighboring portions, e.g. at least 3 times, at least 5 times or at least 10 times. This may also be referred to as a sequence of long, thin loops. With such an arrangement, it is likely that an object is at least partially disposed in the proximity of the portion that is closest to the detection node. As mentioned above, this gives rise to a relatively high influence on the total impedance, wherefore the object can be detected with increased reliability.

The total impedance depends partially on the impedance of the conductive element and partially on the (mostly capacitive) impedance between the conductive element and ground that is influenced by the presence of the object. Evaluating the measurement is facilitated if the impedance of the conductive element is known. It can either be determined by calculation or by calibration. In such an embodiment, the detection circuit is adapted to detect the presence of the object based on a known impedance of the conductive element. In other words, the detection circuit can reference the impedance of the conductive element to eliminate its influence from the total impedance measurement.

According to one embodiment, the detection circuit is configured to operate at least one detection node in a transmitting mode, in which the detection circuit applies a transmission signal to the at least one detection node, and to detect the object based on a received signal from at least one receiving unit. The detection circuit may apply a current signal or a voltage signal as the transmission signal. The transmission signal gives rise to an electromagnetic field which is received by the at least one receiving unit and induces an electrical signal which corresponds to the received signal. The received signal is influenced by whether an object is present between the conductive element (or, more specifically, the vicinity of the respective detection node) and the receiving unit, which may also be referred to as a receiving antenna, a receiving electrode or the like. The detection circuit can be connected to the receiving unit in order to detect the receiving signal. If the detection circuit is connected to a plurality of detection nodes, it may be configured to operate all of them or only some (possibly only one) of them in the transmitting mode.

According to another embodiment, the detection circuit is configured to operate at least one detection node in a receiving mode, in which the detection circuit detects the object based on a received signal from the at least one detection node in response to a transmission signal applied to at least one transmitting unit. In other words, a transmission signal is applied to a transmitting unit, which could also be referred to as a transmission antenna, a transmission electrode or the like. The transmission signal gives rise to an electromagnetic field which is received by the conductive element and induces an electrical signal which corresponds to the received signal at the respective detection node. The received signal depends on whether an object is present between the transmitting unit and the conductive element (or, more specifically, the vicinity of the respective detection node). The detection circuit can be connected to the transmitting unit in order to apply the transmission signal. The transmission signal can be a current signal or a voltage signal. If the detection circuit is connected to a plurality of detection nodes, it may be configured to operate all of them or only some (possibly only one) of them in the receiving mode.

The measurement error in the detected impedance can be reduced by resonance measurements. In one embodiment, the system comprises a capacitive element, which is connectable to ground in parallel to the at least one detection node via a switch. In other words, by opening or closing the switch, the capacitive element can be connected to ground or disconnected from ground. When the switch is closed, the capacitive element is connected to ground and in parallel to the at least one detection node with respect to a detector power source of the detection circuit. In this embodiment, the detection circuit is configured to determine a first resonance frequency when the switch is open and a second resonance frequency when the switch is closed and to detect the object based on the first and second resonance frequency. Each of the resonance frequencies can be detected by sweeping the frequency of the detector power source and determining the frequency with the maximum response. E.g., if the detector power source is a current source, the resonance frequency corresponds to the maximum voltage at the detection node. For instance, if the first resonance frequency $f_{ra}$ with the switch open corresponds to the unknown impedance in parallel to the impedance of the conductive element and the second resonance frequency $f_{rb}$ corresponds to the known capacitance $C_{ref}$ of the capacitive element in parallel to the unknown impedance and the impedance of the conductive element, the corrected measured capacitance can be calculated as follows:

$$C_{ref} \cdot \frac{f_{rb}^2}{f_{ra}^2 - f_{rb}^2}$$

There are several ways how the influence of the impedance associated with the inductive element on the measurements can be reduced, if not eliminated. According to one such option, the detection circuit is configured to detect the object based on relative changes of a measured impedance. In other words, the total impedance, which at least partially depends on the conductive element, is disregarded and only relative changes are considered. These changes, especially when considered on a short-term basis, can be associated with an object entering or leaving the proximity of the conductive element.

According to one embodiment, the detection circuit is adapted to operate at least one detection node in an inactive mode, in which the potential at the detection node is maintained at the potential of a detection node that is operated in loading mode or in receiving mode, or at AC ground. Such a detection node in an inactive mode may be disposed between detection nodes operated in loading mode or in receiving mode, respectively, or it may be disposed between one such detection node and a terminal. For example, if a single first detection node is operated in loading mode, a second and third detection node, operated in an inactive mode, may be disposed between the first detection node and each terminal. If the potential of each of the second and third detection node is maintained at the potential of the first detection node, the potentials on the terminals are shielded from the first detection node. Also, if at least one detection node is operated in transmitting mode and at least one detection node is operated in receiving mode, at least one detection node can be operated in an inactive mode so that its potential is maintained at the potential of the "receiving" node. Operating a detection node in an inactive mode creates an inactive portion or area. In other words, the effective sensing area is reduced. Therefore, it may be preferable to only temporarily operate a detection node in an inactive mode, as will be further explained below.

According to one embodiment, the detection circuit is configured to operate at least two detection nodes in loading mode or in transmitting mode with different signals which have different measurement frequencies, which are orthogonal PRN (pseudo random noise) sequences, or which are periodic signals modulated with orthogonal PRN sequences. In other words, at least one detection node is operated with one signal and at least one detection node is operated with a different signal. By applying such different signals, different active areas can be defined. Using different measurement frequencies for the different signals or, more generally, separate frequency spectra ensures that there is no interference between the different active areas. The same can be achieved by using (pairwise) orthogonal pseudo random noise sequences or periodic signals modulated with orthogonal pseudo random noise sequences.

In particular, but not exclusively, if there is only one detection node, the transmitting unit or the receiving unit, respectively, must be external to the conducting element. However, if there is a plurality of detection nodes, one detection node can be used to transmit a signal, while another detection node is used to receive a signal. In such an embodiment, the detection circuit is configured to operate at least one detection node in transmitting mode and at least one detection node in receiving mode. It should be noted that this embodiment can be combined with the above-mentioned embodiment where different detection nodes are operated in transmitting mode with different signals. Thus, different coupling paths between different detection nodes can be used simultaneously. It is understood that there is a multitude of possibilities here, like operating a plurality detection nodes in transmission mode with different signals and/or operating a plurality of detection nodes in receiving mode.

It is possible that the detection circuit operates each detection node in a given operating mode all the time. However, it is preferred that the detection circuit is configured to sequentially operate different detection nodes in loading mode, transmitting mode, receiving mode and/or inactive mode. For instance, if some detection nodes are operated in transmitting mode and others are operated in receiving mode, it may be useful to sequentially use different combinations of transmitting detection nodes and receiving detection nodes, which corresponds to different coupling paths. Also, if one or several nodes detection nodes are operated in inactive mode, this normally corresponds to an inactive portion or inactive area of the conductive element, where an object cannot be effectively detected. This problem can be overcome if a specific detection node is only temporarily operated in the inactive mode. I way of example, the system could comprise 5 detection nodes and the detection circuit could be configured to operate 2 detection nodes in loading mode and 3 detection nodes in inactive mode, while sequentially applying different combinations of "active" detection nodes (i.e. nodes that are in loading mode).

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 1:
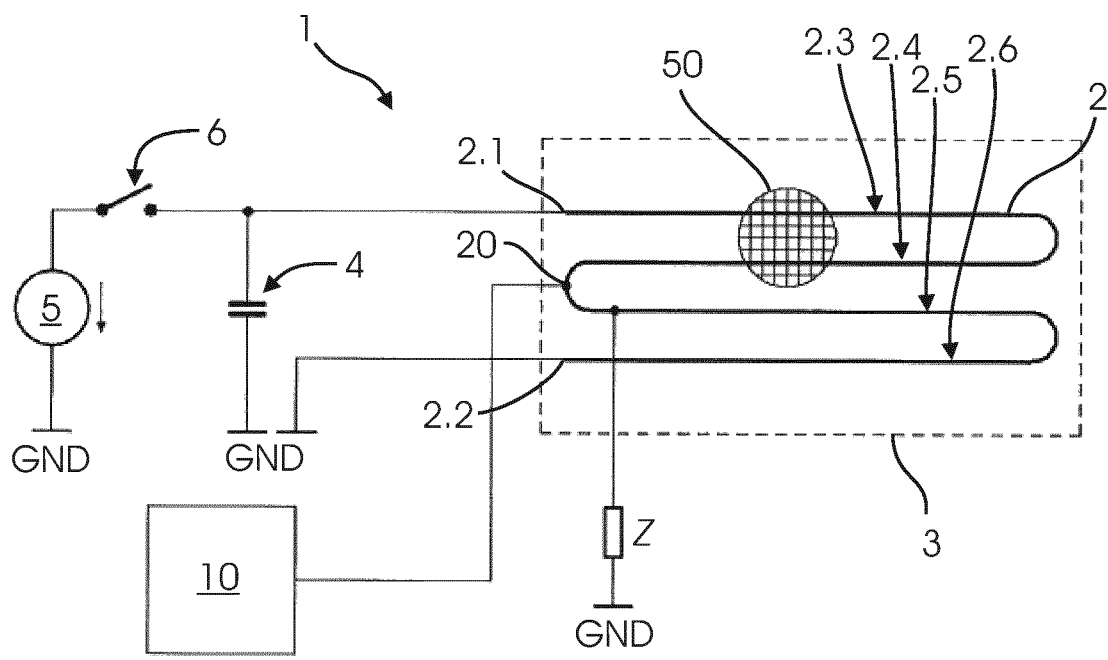
FIG. 1 is a schematic view of a first embodiment of an inventive system for capacitive object detection.

FIG. 1 schematically shows a first embodiment of a system 1 for capacitive object detection. It comprises a heating conductor 2, which may be an elongate printed conductor path disposed along the surface of a heater 3. This could be e.g. a heater 3 for heating a steering wheel of a vehicle or a seat heater a seat of a vehicle. The heating conductor 2 extends from a first terminal 2.1 to a second terminal 2.2. It is disposed in a meandering way with a plurality of alternatingly directed conductor portions 2.3-2.6. The conductor portions 2.3-2.6 are long and disposed relatively close together so that a length of each conductor portion 2.3-2.6 is at least 5 times the distance between two neighboring conductor portions 2.3-2.6. The first terminal 2.1 is connectable via a switch 6 to an electrical power source 5 providing electrical power to the heater 3. The switch 6 can be e.g. a semiconductor switch or any other suitable type. In this embodiment, the switch 6 is shown as a high side switch, but it could also be a low side switch, or one high side and one low side switch for safety reasons. Furthermore, the first terminal 2.1 is connected to ground via a first capacitor 4, which keeps the first terminal 2.1 at a defined AC potential. The second terminal 2.2 is connected to ground, and therefore also at a defined AC potential.

A detection circuit 10, which is adapted to detect the presence of an object 50 in the proximity of the heating conductor 2, is connected to a first detection node 20. In the embodiment of FIG. 1, the detection circuit 10 is operating the first detection node 20 in a loading mode, in which it applies a detection signal (e.g. an AC voltage) to the detection node 20 and detects a response signal (e.g. an AC current) at the detection node 20, thus measuring a complex impedance between first detection node 20 and ground. The complex impedance between the first detection node 20 and ground can be regarded as a parallel connection of the unknown impedance Z and the impedance of the heating conductor 2, which is mainly inductive. In this context it is noted that the impedance may also comprise a resistive, however this resistive part is not practically relevant, as it is always significantly lower than the impedance of the capacitance to be measured. The inductive part of the impedance of the heating conductor 2 decouples the terminals 2.1, 2.2 from the detection node 20. Due to the physical structure of the heating conductor 2, the sensing sensitivity is dependent on the location of the object 50 to be detected. The closer the object 50 is to the detection node 20, the more accurately its impedance Z can be measured. If it is closer to one of the terminals 2.1, 2.2, more measurement current will flow into the terminals 2.1, 2.2 and into ground, and thus the unknown impedance Z cannot be measured with high accuracy.

Figure 2:
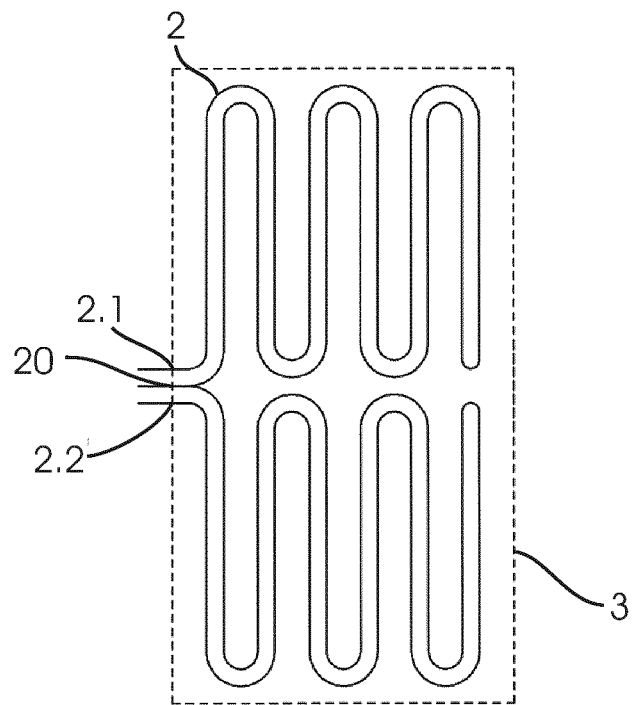
FIG. 2 is a schematic view of a part of a second embodiment of an inventive system.

In order to at least partially compensate for this problem, the heating conductor 2 is arranged in a meandering way, so that more sensitive portions of the heating conductor 2 are normally included in an area where the object 50 is located. As shown in FIG. 1, the object 50 can be detected reliably because it is at the same time located over a more sensitive part of the heating conductor 2 (the second portion 2.4 from top) and a less sensitive part of the heating conductor 2 (the top portion 2.3). As shown in FIG. 1 and in FIG. 2, which represents a heater 3 according to a second embodiment of the invention, the heating conductor 2 should comprise between the first terminal 2.1 and the detection node 20, and between the detection node 20 and the second terminal 2.2, respectively, a plurality of long, thin loops, with parallel portions 2.3-2.6 in forward and reverse directions, and preferably with a minimized distance between the parallel portions 2.3-2.6.

Preferably, the detection signal applied by the detection circuit 10 has at least one frequency that is selected such that the impedance of the inductance of the heating conductor 2 is at least a substantial fraction, e.g. at least 10% or at least 20%, of the unknown impedance Z to be determined.

In order to facilitate determining the impedance Z, the impedance of the heating conductor 2 is preferably known a priori, for example by calibration, or by characterization, and this a priori impedance is then removed from the measured impedance at the detection node 20. Another preferred option, by which a measurement error can be minimized or eliminated, is to only evaluate changes of the measured impedance.

Figure 3:
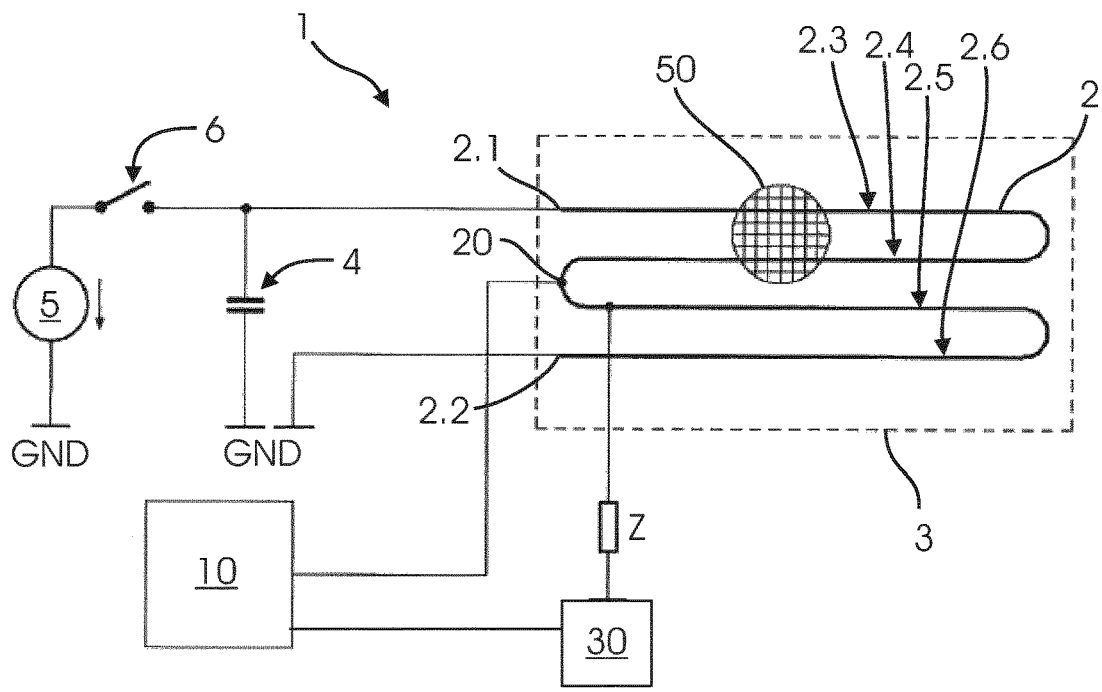
FIG. 3 is a schematic view of a third embodiment of an inventive system.

FIG. 3 shows a third embodiment of a system 1, which is a modification of the embodiment of FIG. 1. In this case, the heating conductor 2 is used as a transmitting unit in a coupling impedance measurement setup. The detection circuit 10 operates the detection node 20 not in a loading mode, but in a transmitting mode, and the unknown impedance Z is not connected to ground, but to a receiving unit 30. The detection circuit 10 applies a transmission signal to the detection node 20. This gives rise to an electric field that is modified by the presence of the object 50 and generates a received signal that can be detected via the receiving unit 30, which is also connected to the detection circuit 10.

Figure 4:
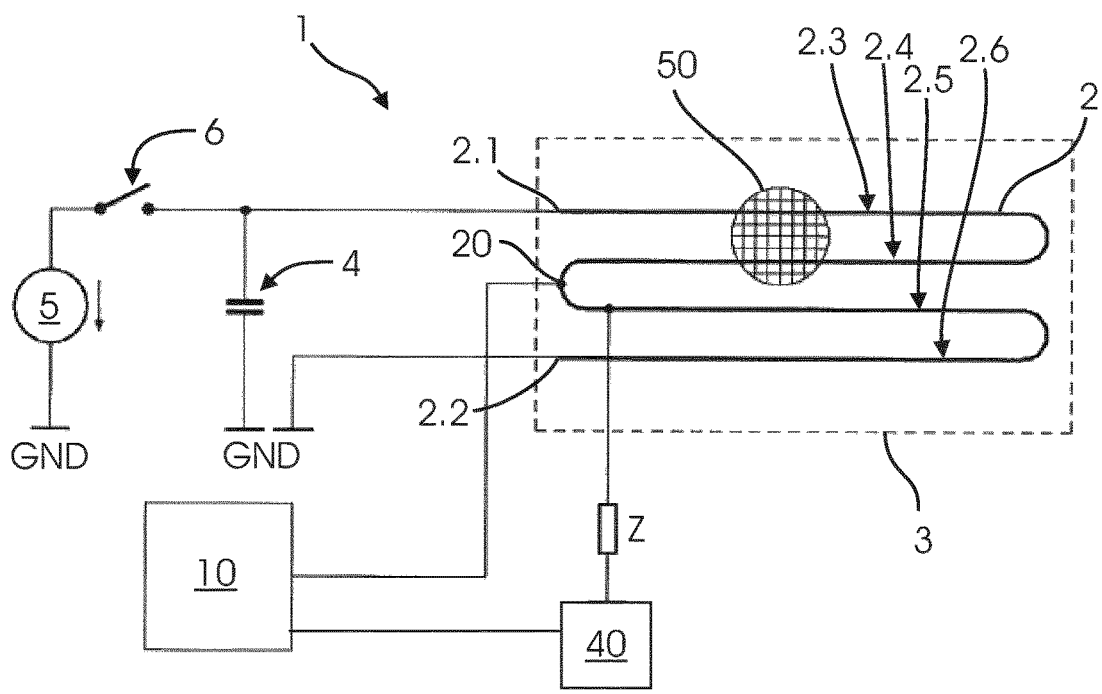
FIG. 4 is a schematic view of a fourth embodiment of an inventive system.

FIG. 4 shows a fourth embodiment of a system 1, which is another modification of the embodiment of FIG. 1. In this case, the heating conductor 2 is used as a receiving unit in a coupling impedance measurement setup. Here, the heating conductor 2 is used as a receiving unit in a coupling impedance measurement setup. The detection circuit 10 operates the detection node 20 not in a loading mode, but in a receiving mode, and the unknown impedance Z is not connected to ground, but to a transmitting unit 40. In this embodiment, the transmitting unit 40 is also connected to the detection circuit 10, which applies a transmission signal to the transmitting unit 40. This gives rise to an electric field that is modified by the presence of the object 50 and generates a received signal that can be detected via the detection node 20.

The advantage of using a coupling impedance measurement setup as shown in FIGS. 3 and 4 is that a substantial part of the inductance of the heating conductor 2 is short-circuited by the detection circuit 10, thereby substantially reducing its influence on the measurement. It will further be appreciated, that the receiving unit 30 in FIG. 3 can be the heater in FIG. 4, and the transmitting unit 40 in FIG. 4 can be the heater in FIG. 3.

In order to reduce the influence of the inductive impedance of the heating conductor 2 on the measured unknown impedance in loading mode measurement, e.g. when the detection signal is an AC voltage signal and the response signal is an AC current at the detection node 20, the measurement can be performed at two distinct frequencies $f_a$ and $f_b$, which can be applied either simultaneously as a superposition or sequentially. With the two respective measured complex admittances being $Y_a$ and $Y_b$, the corrected capacitance can be calculated as follows:

$$\frac{1}{2 \times \pi} \times \operatorname{Im}\left(\frac{Y_a \cdot f_a - Y_b \cdot f_b}{f_b^2 - f_a^2}\right)$$

Figure 5:
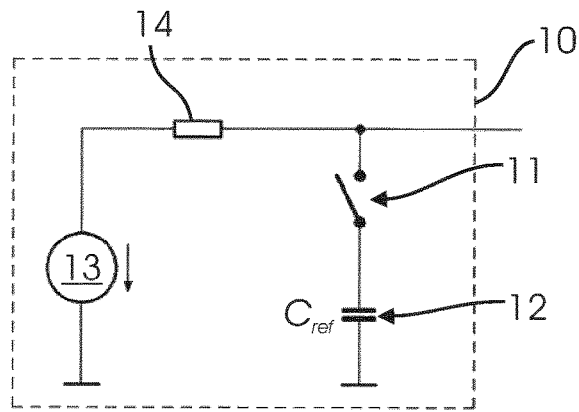
FIG. 5 is a schematic view of a detection circuit for an inventive system.

FIG. 5 illustrates a detection circuit 10 which may be used in the system 1 shown in FIG. 1. In this case, the detection circuit 10 applies an AC current can to the detection node 20, and the voltage on detection node 20 can be measured. A detector power source 13, in this case a voltage source, generates an AC voltage, and coupling element, in this case an impedor 14, injects an AC current into the detection node 20. Alternatively to injecting a current via an impedor 14, a current source could also be used as the detector power source 13. In this case, the voltage on detection node 20 is measured in order to determine the unknown impedance to be measured.

The detection circuit 10 in FIG. 5 also comprises a second capacitor 12 having known capacitance, which is connectable to the detection node 20 via a second switch 11. This arrangement allows for a reduction of the measurement error. When the switch is closed, the capacitor 12 is connected to ground and in parallel to the detection node 20 with respect to the detector power source 13. The detection circuit 10 is configured to determine a first resonance frequency $f_{ra}$ when the switch 11 is open and a second resonance frequency $f_{rb}$ when the switch 11 is closed. Each of the resonance frequencies $f_{ra}$, $f_{rb}$ can be detected by sweeping the frequency of the detector power source 13 and determining the frequency with the maximum response. The corrected measured capacitance can be calculated as follows:

$$C_{ref} \cdot \frac{f_{rb}^2}{f_{ra}^2 - f_{rb}^2}$$

Figure 6:
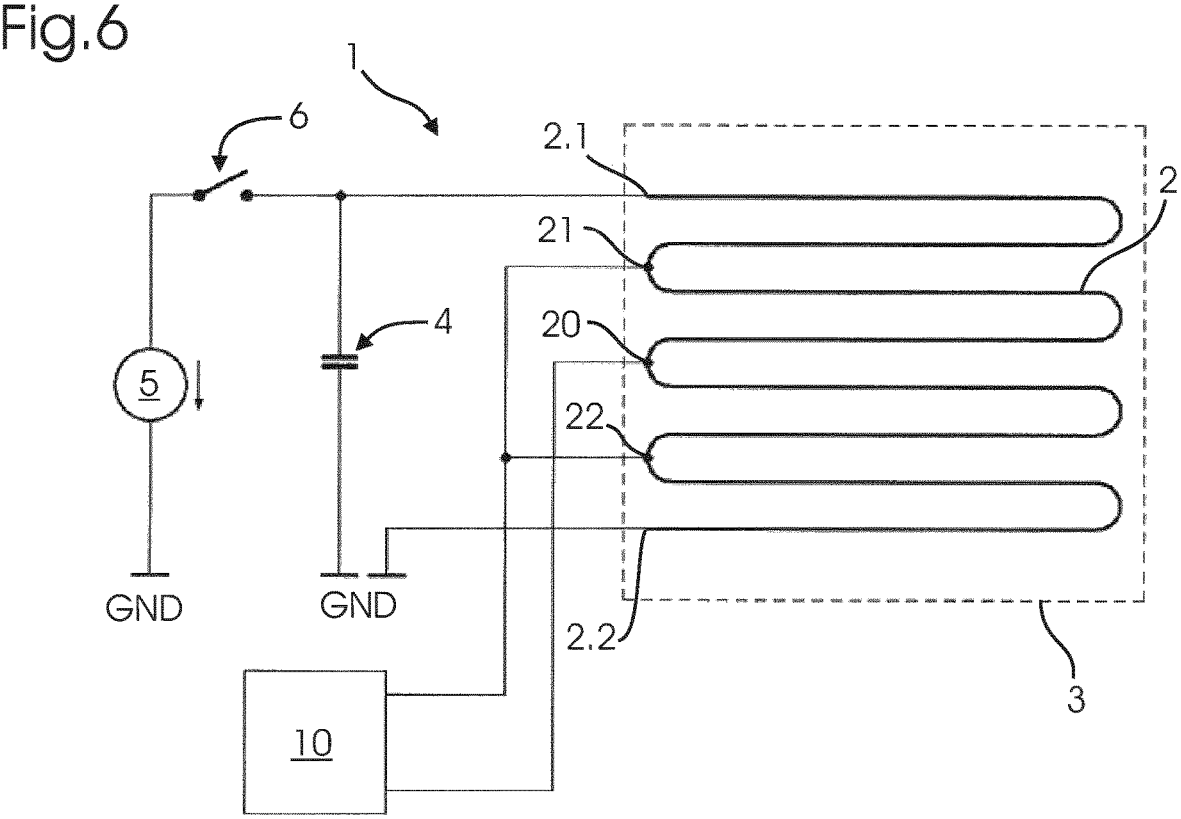
FIG. 6 is a schematic view of a fifth embodiment of an inventive system.

FIG. 6 shows a fifth embodiment of a system 1, which represents another option to reduce the influence of the heating conductor 2 on the measurement result. The detection circuit 10 is connected to a second detection node 21 and a third detection node 22, which are disposed between the first detection node 20 and the first and second terminal 2.1, 2.2, respectively. The detection circuit 10 keeps the second and third detection node 21, 22 at substantially the same voltage as the first detection node 20, thereby shielding the AC ground potentials of the terminals 2.1, 2.2 from the first detection node 20. One could also say that the second and third detection node 21, 22 function as guard nodes or guard electrodes for the first detection node 20. The guarding achieved hereby eliminates the influence of the inductance of the heater on the capacitive measurement as disclosed above. The disadvantage is that the sensing area is relatively smaller than for the "unguarded" embodiment in FIG. 1, due to the guarded parts of the heating conductor 2.

Figure 7:
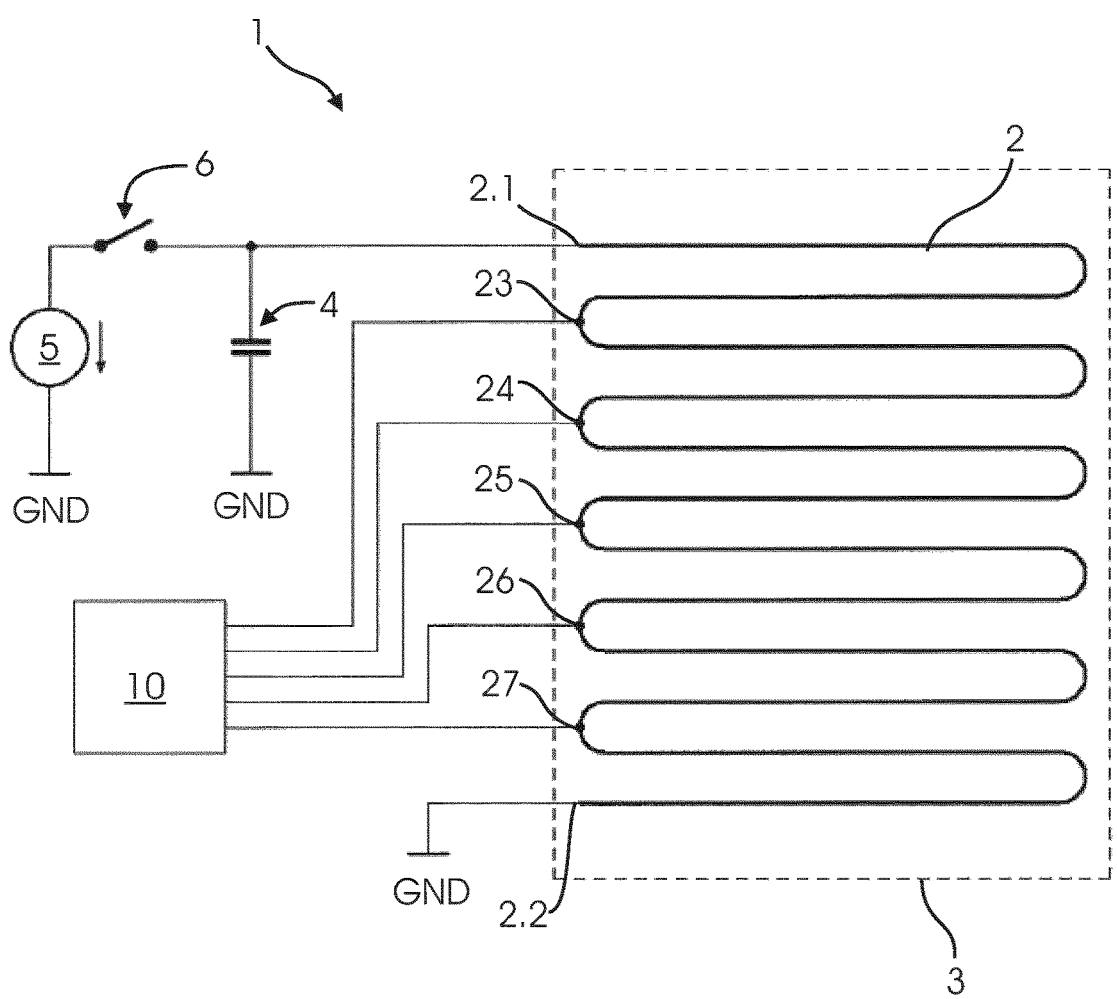
FIG. 7 is a schematic view of a sixth embodiment of an inventive system.

FIG. 7 shows a sixth embodiment of a system 1, which corresponds to a multizone application. Detection nodes 23-27 are connected to the detection circuit 10. A multitude of sensing options are possible.

The detection circuit 10 can operate the first set, comprising at least one detection node 23-27, in a loading mode, thereby defining the active area(s), and operate a 2nd set, comprising at least one of the detection nodes 23-27, in an inactive mode by keeping it at the same potential as one detection node 23-27 from the first set, or at AC ground, thereby defining the inactive areas. Preferably, the detection circuit 10 sequentially operates different first and second sets of detection nodes 23-27 in loading mode and in inactive mode, respectively.

Also, at least two detection nodes 23-27 may be operated in loading mode at different frequencies, thereby defining at least two separate active sensing areas. Attentively, at least two detection nodes 23-27 can be operated in loading mode with detection signals which are orthogonal PRN (pseudo random noise) sequences, or periodic signal modulated with orthogonal PRN sequences, thereby defining at least two separate active sensing areas.

Furthermore, at least one detection node 23-27 can be operated in a transmitting mode, and at least one detection node 23-27 can be operated in a receiving mode. Optionally, at least one detection node 23-27 can be connected to AC ground or the same potential as a detection node in receiving mode, thereby defining one active transmitting area, one active receiving area, and optionally one inactive area, allowing to perform coupling measurements. Preferably, the detection circuit 10 sequentially operating a different detection nodes 23-27 in transmitting mode and in receiving mode (and, optionally, in inactive mode), respectively, thereby defining different coupling paths.

The detection circuit 10 may also operate at least two detection nodes 23-27 in transmitting mode with different transmitting frequencies, thereby defining multiplying the number of coupling paths. Apart from using different transmitting frequencies, it is also possible to use different transmitting signals which are orthogonal PRN (pseudo random noise) sequences, or periodic signal modulated with orthogonal PRN sequences.

The invention claimed is:

1. A system for capacitive object detection, comprising:
    an elongate conductive element extending between a first terminal and a second terminal, wherein the first terminal is coupled to ground via a first capacitive element and is connectable to an electrical power source, and the second terminal is connected to ground; and
    a detection circuit connected to at least one detection node disposed on the conductive element between the first and second terminal;
    wherein the detection circuit is adapted to capacitively detect the presence of an object in the proximity of the conductive element based on a impedance associated with the object, the detection circuit being configured to operate at least one detection node in a loading mode, in which the detection circuit applies a detection signal to the at least one detection node and detects the object based on a response signal at the detection node;
    wherein the detection circuit is configured to operate at least one detection node in a transmitting mode, in which the detection circuit applies a transmission signal to the at least one detection node, and to detect the object based on a received signal from at least one receiving unit; and
    wherein the detection circuit is adapted to sequentially and/or simultaneously apply two different frequencies as the detection signal to the at least one detection node and to detect the object based on a frequency-dependent response signal.

2. A system according to claim 1, wherein the detection circuit is connected to a plurality of detection nodes between the first and second terminal.

3. A system according to claim 1, wherein the conducting element is disposed in a meandering way between at least one detection node and at least one terminal.

4. A system according to claim 1, wherein the detection circuit is adapted to detect the presence of the object based on a known impedance of the conductive element.

5. A system according to claim 1, wherein the detection circuit is configured to operate at least one detection node in transmitting mode and at least one detection node in receiving mode.

6. A system according to claim 1, wherein the detection circuit is configured to sequentially operate different detection nodes in loading mode, transmitting mode, receiving mode and/or inactive mode.

7. A system according to claim 1, further comprising a capacitive element, which is connectable to ground in parallel to the at least one detection node via a switch, and the detection circuit is configured to determine a first resonance frequency when the switch is open and a second resonance frequency when the switch is closed and to detect the object based on the first and second resonance frequency.

8. A system according to claim 1, wherein the detection circuit is configured to detect the object based on relative changes of a measured impedance.

9. A system according to claim 1, wherein the detection circuit is adapted to operate at least one detection node in an inactive mode, in which the potential at the detection node is maintained at the potential of a detection node that is operated in loading mode or in receiving mode, or at AC ground.

10. A system according to claim 1, wherein the detection circuit is configured to operate at least two detection nodes in loading mode or in transmitting mode with different signals which have different measurement frequencies, which are orthogonal PRN sequences, or which are periodic signals modulated with orthogonal PRN sequences.

11. A system for capacitive object detection, comprising:
    an elongate conductive element extending between a first terminal and a second terminal, wherein the first terminal is coupled to ground via a first capacitive element and is connectable to an electrical power source, and the second terminal is connected to ground; and
    a detection circuit connected to at least one detection node disposed on the conductive element between the first and second terminal;
    wherein the detection circuit is adapted to capacitively detect the presence of an object in the proximity of the conductive element based on a impedance associated with the object, the detection circuit being configured to operate at least one detection node in a loading mode, in which the detection circuit applies a detection signal to the at least one detection node and detects the object based on a response signal at the detection node;
    wherein the detection circuit is configured to operate at least one detection node in a receiving mode, in which the detection circuit detects the object based on a received signal from the at least one detection node in response to a transmission signal applied to at least one transmitting unit; and
    wherein the detection circuit is adapted to sequentially and/or simultaneously apply two different frequencies as the detection signal to the at least one detection node and to detect the object based on a frequency-dependent response signal.

12. A system according to claim 11, wherein the detection circuit is configured to operate at least one detection node in transmitting mode and at least one detection node in receiving mode.

13. A system according to claim 11, wherein the detection circuit is configured to sequentially operate different detection nodes in loading mode, transmitting mode, receiving mode and/or inactive mode.

14. A system according to claim 11, wherein the detection circuit is connected to a plurality of detection nodes between the first and second terminal.

15. A system according to claim 11, wherein the conducting element is disposed in a meandering way between at least one detection node and at least one terminal.

16. A system according to claim 11, wherein the detection circuit is adapted to detect the presence of the object based on a known impedance of the conductive element.

17. A system according to claim 11, further comprising a capacitive element, which is connectable to ground in parallel to the at least one detection node via a switch, and the detection circuit is configured to determine a first resonance frequency when the switch is open and a second resonance frequency when the switch is closed and to detect the object based on the first and second resonance frequency.

18. A system according to claim 11, wherein the detection circuit is configured to detect the object based on relative changes of a measured impedance.

19. A system according to claim 11, wherein the detection circuit is adapted to operate at least one detection node in an inactive mode, in which the potential at the detection node is maintained at the potential of a detection node that is operated in loading mode or in receiving mode, or at AC ground.

20. A system according to claim 11, wherein the detection circuit is configured to operate at least two detection nodes in loading mode or in transmitting mode with different signals which have different measurement frequencies, which are orthogonal PRN sequences, or which are periodic signals modulated with orthogonal PRN sequences.

* * * * *